United States Patent Office.

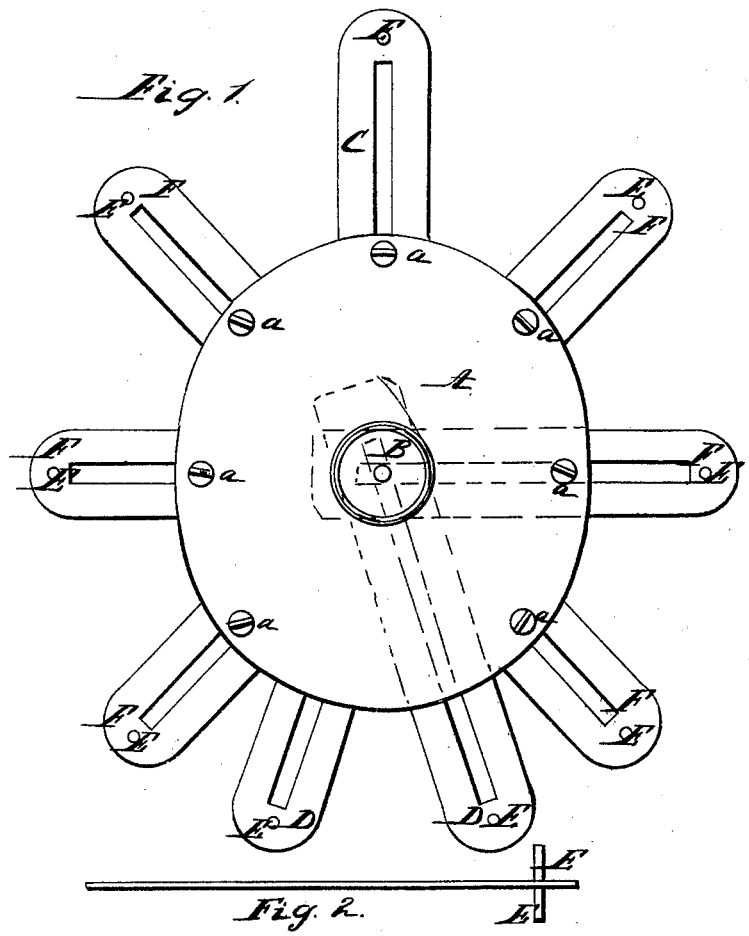

HORACE B. FERREN, OF BATAVIA, NEW YORK.

Letters Patent No. 82,214, dated September 15, 1868.

---

IMPROVEMENT IN DEVICE FOR MEASURING THE FEET OF HORSES.

---

The Schedule referred to in these Letters Patent and making part of the same.

---

TO ALL WHOM IT MAY CONCERN:

Be it known that I, HORACE B. FERREN, of Batavia, in the county of Genesee, and in the State of New York, have invented certain new and useful Improvements in Conformature for Measuring Horses' Feet; and do hereby declare that the following is a full, clear, and exact description thereof, reference being had to the accompanying drawings, and to the letters of reference marked thereon.

The nature of my invention consists in the construction of a device for measuring horses' feet for fitting shoes.

In order to enable others skilled in the art to which my invention appertains to make and use the same, I will now proceed to describe its construction and operation, referring to the annexed drawings, which form a part of this specification, and in which—

Figure 1 is a plan view, and

Figure 2 a side view of one of the slides used in the same.

A represents a circular or oval plate, which is placed over another similar plate, a screw-bolt passing up from the centre of the lower plate through the centre of the upper, and a knob or nut, B, is placed on the said screw, whereby the plates are held together.

Nine slides are placed between these plates, all of which slides are slotted and work around the centre screw-rod, the said rod passing up through the slots on the slides.

One of these slides, C, is placed exactly at the front of the plates, that is, if it is oval at the point farthest from the centre, where a screw or bolt, a, passes through both plates and through the slot on the slide. By that means, it will be seen, this slide can be moved out or in, but not sideways.

In like manner, six more slides, F F, are placed, three on each side of the first, two of them being exactly at right angles with the first, and two at an angle of forty-five degrees. The remaining two, of the six mentioned, are placed at an angle of forty-five degrees with the side-slides; all of which is clearly shown in fig. 1. These slides are kept in their proper position by similar screws or bolts, a a, as the first slide.

Opposite the first slide, and extending at the rear of the plates, are two slides, D D, which are not held in one position, but may be moved outwards or inwards from each other, as well as from the centre.

All the slides mentioned are provided at their outer ends with a pin, E, which extends both above and below the same.

When it is desired to use the device, place the centre of the lower plate as near as possible on the centre of the foot. The two movable slides D D can then be placed so as to measure the distance at the heel, and the other slides are then moved in until the pins E E strike the edge of the hoof, when the knob or nut B is screwed tightly down, which will give the exact measure of the hoof.

It will be seen that, in the manner I have arranged the slides, I obtain very easily, and without any trouble, the measure of the foot across the longest part and widest part, as well as across the quarter, and I have only one screw to turn.

Horses' feet never being alike on both sides, it is necessary to have the pins E E extend on both sides of the slides, as else the shoe made from such measure would be turned and not fit the foot.

I am aware of the patent of Moses S. Woodward, dated October 29, 1867, and I do not wish to be understood as claiming the device therein described; but What I do claim as an improvement thereon, is—

In combination with the slides F F, the adjustable slide C and the adjustable heel-slides D D, as described, all secured to the one centre-screw B, as and for the purpose described.

In testimony that I claim the foregoing, I have hereunto set my hand, this 29th day of August, 1868.

HORACE B. FERREN.

Witnesses:
LEOPOLD EVERT,
A. A. YEATMAN.